Jan. 23, 1968  TETSUYA SATO  3,364,866
DEVICE FOR LUBRICATING PUMP BEARINGS AND BALANCING
AXIAL THRUST THEREOF
Filed Aug. 17, 1964  3 Sheets-Sheet 1

INVENTOR
Tetsuya Sato
BY Stevens, Davis, Miller & Mosher
ATTORNEY

Jan. 23, 1968  TETSUYA SATO  3,364,866
DEVICE FOR LUBRICATING PUMP BEARINGS AND BALANCING
AXIAL THRUST THEREOF
Filed Aug. 17, 1964  3 Sheets-Sheet 2
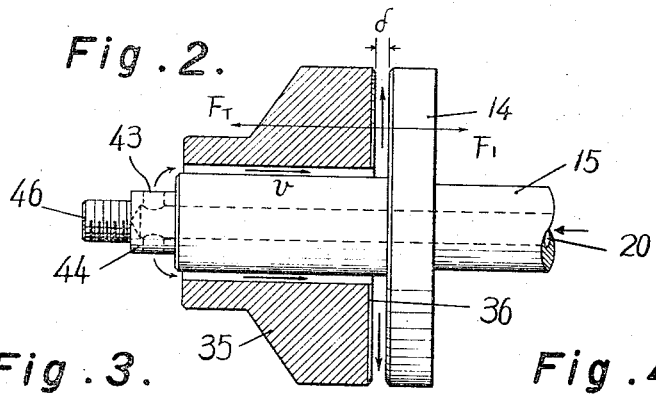
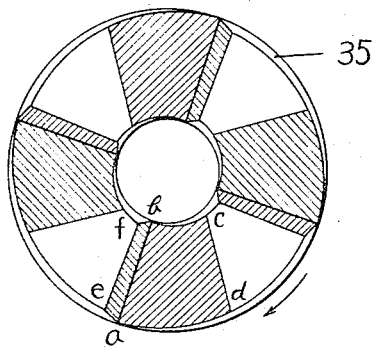
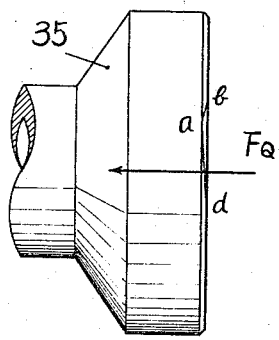
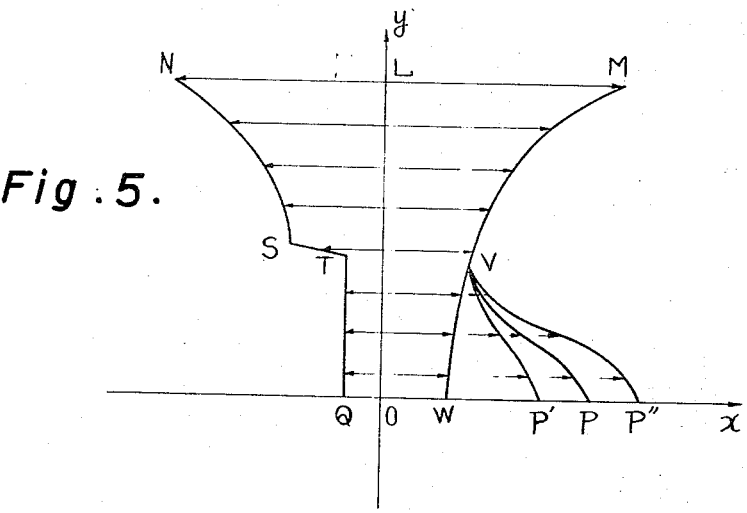
INVENTOR
Tetsuya Sato
BY Stevens, Davis, Miller & Mosher
ATTORNEY Jan. 23, 1968 TETSUYA SATO 3,364,866
DEVICE FOR LUBRICATING PUMP BEARINGS AND BALANCING
AXIAL THRUST THEREOF
Filed Aug. 17, 1964 3 Sheets-Sheet 3

INVENTOR
Tetsuya Sato
BY Stevens, Davis, Miller + Mosher
ATTORNEY

United States Patent Office 3,364,866
Patented Jan. 23, 1968

3,364,866
DEVICE FOR LUBRICATING PUMP BEARINGS AND BALANCING AXIAL THRUST THEREOF
Tetsuya Sato, Ibo-gun, Hyogo Prefecture, Japan, assignor to Kabushiki Kaisha Teikoku Denki Seisakusho, Osaka, Japan, a corporation of Japan
Filed Aug. 17, 1964, Ser. No. 390,083
2 Claims. (Cl. 103—87)

ABSTRACT OF THE DISCLOSURE

A pump having an axial air gap type induction motor on an impeller mounted on a stationary shaft through a radial bearing and a thrust bearing. A means for feeding a portion of the output of the pump back through the stationary shaft to thereby lubricate the bearings and balance the axial thrust of the impeller.

The present invention relates to a device for lubricating a bearing and simultaneously and automatically balancing the axial thrust thereof for use in a pump provided with an axial air gap type induction motor.

In a conventional fluid pump provided with an axial air gap type induction motor, a rotary magnetic field is produced between the stator core and the rotor core, which results in a production of magnetic attractive forces. In the generally used induction motor, these magnetic attractive forces compensate one another in the radial direction, so that these forces do not act upon the rotating shaft and the bearing. In the pump provided with an axial air gap type induction motor, however, a problem has been encountered in that a very strong attractive force is generated in the axial direction. This invention, therefore, contemplates to obviate such defect.

The principal object of the invention is to provide a device for lubricating a pump bearing and balancing the axial thrust thereof, which is adapted to lubricate continuously the rotating surface formed between a stationary shaft and a bearing for a pump impeller by means of a liquid itself whereby to provide a pump provided with an axial air gap type induction motor which is efficient in operation and long in life.

For a better understanding of the invention, reference is taken to the accompanying drawings, in which, FIG. 1 is a longitudinal sectional view of a pump provided with a device embodying the invention;

FIG. 2 is a side view of a stationary shaft with a bearing thereof shown in section;

FIG. 3 is an end view of the bearing shown in FIG. 2;

FIG. 4 is a side view of the bearing shown in FIG. 2;

FIG. 5 is a graph illustrating the pressure distribution in the pump chambers shown in FIG. 1;

Figure 1:
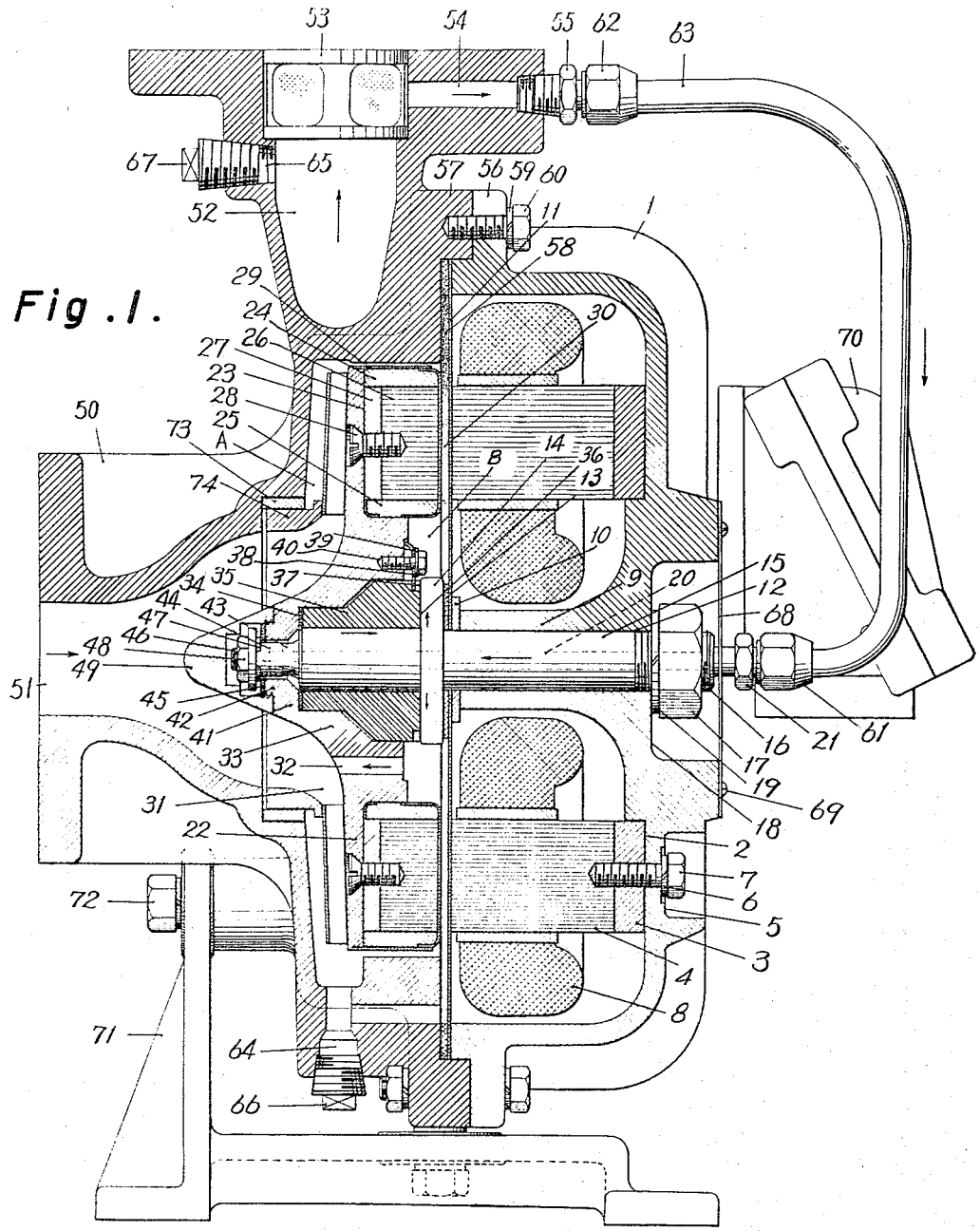

Referring to the drawings, 1 represents a motor casing opened at its inner end and formed at its peripheral inside surface with an annular step 2. Welded to this annular step 2 are several supporting plates 3 which serve to support an annular stator core 4 of an axial air gap type induction motor. The motor casing 1 is formed at the peripheral outside surface of the outside wall thereof with several recesses 5 spaced one from the other with a given interval where the stator core 4 is secured to the supporting plate 3 by means of several bolts 7 each extending through a washer 6 and the supporting plate 3. A stator coil 8 of the axial air gap type induction motor is wound around the stator core 4. Thus, the motor casing 1 encloses therein the stator core 4 and the stator coil 8 of the axial air gap type induction motor in the stationary state. The motor casing 1 is provided at its inner center part integrally with a center projection 9. A non-magnetic anti-corrosive sealing partition wall plate 11 comes closely in contact with the inner end surface of the center projection extending through an inserting plate 10, also with the inner open end of the motor casing 1, and with the inner end surface of the stator core 4.

The center projection 9 of the motor casing 1 is provided with a bore hole 12 into which is fitted an outside portion of a stationary shaft 15 having an intermediate thrust collar 14 made integral therewith and extending through a packing 13, the partition wall plate 11, and an inserting plate 10. The stationary shaft 15 is provided at its outer end with outer threads 16 is secured to the bottom surface of a recess 18 formed at the center of the outside wall of the motor casing 1 through a washer 19 by means of a nut 17 which is in mesh with the threads 16. The stationary shaft 15 is provided at its center with an interior bore hole 20 which extends through the total length of the shaft 15 and the outer end of which is in mesh with a nipple 21.

A pump impeller 22 is provided at its outside surface with an annular step 23 to which is secured an annular rotor core 26 of the axial air gas type induction motor provided with outer and inner copper rings 24 and 25, respectively by means of several counter-sunk bolts 28 extending from the inside surface of the pump impeller 22, through several supporting plates 27 welded to the rotor core 26 at portions spaced one another by a given interval. An anti-corrosive paint or an anti-corrosive thin metal plate 29 is painted or covered on the exposed surface of the rotor core 26 and on the inner and outer peripheral exposed surfaces of the inner and outer copper rings 25 and 24. The stator core 4 and the rotor core 26 are arranged in opposition to form a small air gap 30.

The pump impeller 22 is provided at its suction inlet 31 with several balance holes 32 spaced apart and arranged along a circle.

On the center boss portion 33 of the pump impeller 22 is mounted a bearing 35 through several washers 34 for adjusting the air gap formed between the stator and rotor cores arranged in opposition. The bearing 35 is slidably fitted around the outside portion of the stationary shaft 15 to constitute a radial sliding member. The bearing 35 is in engagement at its outer end surface with the thrust collar 14 to form a thrust surface 36 whose outer peripheral part is provided at several portions thereof with grooves 37. A bearing clamping piece 38 is inserted between the groove 37 and the outer end surface of the center boss portion 33 of the pump impeller 22 and secured to the center boss portion 33 through a locking washer 39 by means of a bolt 40 so as to secure the bearing 35 integrally with the pump impeller 22.

The center boss portion 33 of the pump impeller 22 is provided at its inside portion with a shoulder 41 which is provided at its inside portion with a cylindrical portion 42 the inside of which surrounds a reduced portion 44 of stationary shaft 15 having several holes 43 acting as nozzles, as will be described later, and communicating with the inner bore hole 20 formed in the stationary shaft 15. An intermediate washer 45 is made in contact with the reduced shaft portion 44. The reduced portion 44 is provided at its outer end portion with an outer peripheral threaded portion 46 which is threadedly engaged with a locking nut 48 through several adjusting washers 47. The outer peripheral threaded portion of the cylindrical portion 42 is threadedly engaged with the inner peripheral thread of a cap nut 49.

Provision is made for a pump casing 50 opened at its inner end and provided at its outer center part with an inlet 51 and at its upper part with an outlet 52 which encloses a filter 53 therein. The pump casing 50 is provided at one side of the filter 53 with a passage 54 whose outer end is threadedly engaged with a nipple 55.

The motor casing 1 is provided at the outer peripheral portion of the inner opening thereof with a peripheral flange 56, whilst the pump casing 50 is provided at the outer peripheral portion of the inner opening thereof with a peripheral flange 57 which is L-shape in section. The peripheral flanges 56 and 57 are brought into engagement through a gasket 58 and clamped together at several points through washers 59 by means of bolts 60, thereby enclosing the pump impeller 22 in the pump casing 50.

At the lower part of the pump casing 50 and at one side portion of the outlet 52 are formed with discharge openings 64 and 65, respectively, which are provided with sealing plugs 66, 67. A cover plate 68 adapted to cover the recess 18 formed at the center of the outside wall of the motor casing 1 is secured to the latter by means of several screws 69. A pressure resistant and anti-explosive type terminal box 70 is secured to the outside wall of the motor casing 1.

The lower part of the pump casing 50 is secured to a pump stand by means of several bolts 72.

If the stator core 4 of the device is constructed as above described is excited, the magnetic field produced causes the rotor core 26 to rotate. Thus, the pump impeller 22 made integral with the rotor core 26 and journalled on the stationary shaft 15 by means of the bearing 35 is made to rotate in the liquid in the pump casing 50, thereby sucking the liquid from the inlet 51 and delivering it to the outlet 52.

Thus, the high pressure liquid flows from the outlet 52 through a filter 53. Some of the high pressure liquid passes through an opening 54, a pipe 63, the internal bore hole 20 of the stationary shaft 15 to the nozzle holes 43 formed near the end of the stationary shaft 15 in a direction shown by arrows. The high pressure liquid is thus forced in jet form through the nozzle holes 43 to lubricate a radial sliding part formed between the inside portion of the stationary shaft 15 and the bearing 35 and then flows through a slight slit passageway formed between the thrust collar 14 and the thrust surface 36 of the bearing 35 and the balance holes 32 formed in the pump impeller 22 and merges into the suction liquid for the pump.

As can be seen from the above mentioned construction, in the pump provided with an axial air gap type induction motor, a rotary magnetic field is produced between the stator core 4 and the rotor core 26, which results in a production of magnetic attractive forces which are proportional to the square of the magnetic density. In the generally used induction motor, these magnetic attractive forces compensate one another in the radial direction, so that these forces do not act upon the rotating shaft and the bearing. In the axial air gap type induction motor, however, a very strong attractive force is applied to the rotor whereby it is forcedly shifted in the axial direction.

As can be seen from the general pump principle, since the liquid pressure in a chamber B of the pump casing 50 as shown in FIG. 1 is higher than that in a chamber A, a thrust is produced to move the pump impeller 22 towards the inlet 51.

If this thrust is $F_s$ and the above mentioned attractive force is $F_m$, these forces act on one another in opposite directions, so that the force acting upon the pump impeller 22 secured to the rotor core 26 can be represented by the following equation $$F_1 = F_m - F_s$$

Here, the sense of $F_1$ is determined by $$|F_m| \lessgtr |F_s|$$

In the practical pump provided with an axial air gap type induction motor, $|F_m| > |F_s|$, so that $F_1$ acts upon the stator. This force $F_1$ is applied to an air gap formed between the thrust surface 36 of the bearing 35 secured to the pump impeller 22 and the thrust collar 14 provided at the center of the stationary shaft 15.

In accordance with the invention, the liquid flowing through said extremely narrow air gap $\delta$ is caused to produce a force $F_t$ having a magnitude equal to that of the force $F_1$, but which is opposite in direction whereby a direct sliding contact between the two thrust bearings is avoided and at the same time lubrication of these two thrust bearings is effected. The force $F_t$ can be represented by the sum of two component forces $F_p$ and $F_q$.

As above mentioned, the pump casing 50 shown in FIG. 1 is divided into the left chamber A and the right chamber B by means of the pump impeller 22 directly connected to the rotor core 26. The pressure distribution in these two chambers along the radial distance from the center line of the stationary shaft 15 is shown in FIG. 5 in which the pressure from the center line of the stationary shaft 15 is plotted on $x$ axis, whilst the radial distance from the center line of the stationary shaft 15 is plotted on $y$ axis. The pressure in the chamber A is taken on the negative side and the pressure in the chamber B on the positive side. In FIG. 5, $\overline{OL}$ represents the maximum outer diameter of the pump impeller whose pressures in the chambers A and B are shown by $\overrightarrow{LN}$ and $\overrightarrow{LM}$, respectively.

If the conventional pump, not provided with the pipe 63 of the lubricating device shown in FIG. 1, but provided with blind plugs at the outlet 54 and the stationary shaft 15 instead of the nipples 55 and 21 so as to prevent flowing in and out of the lubricating liquid, is driven with the shaft and the bearings immersed in the liquid, the pressure distribution in the chamber A is shown by a curve NSTQ in FIG. 5, whilst the pressure distribution in the chamber B is shown by a curve MVW. ST shows the pressure drop produced across a narrow junction between a wearing ring 73 pressed against the inside surface of the pump casing 50 shown in FIG. 1 and a front shroud 74 of the pump impeller 22. Thus, in the chamber A there is produced the thrust $F_a$ which is proportional to the volume of the rotating body of the area OLNSTQO around the $x$ axis and causes the pump impeller 22 to move to the right side. In the chamber B there is produced a thrust $F_b$ which is proportional to the volume of the rotating body of the area OLMVWO around the $x$ axis and causes the pump impeller 22 to move towards the inlet 51 in the left direction. The above mentioned $F_s$ is expressed by $$F_s = F_b - F_a$$

Now, if the pump provided with the lubricating device shown in FIG. 1 is driven, the pressure distribution in the chamber B is shown by the curve MVP as is shown in FIG. 5. That is, the pressure is increased by a force $F_p$ which is proportional to the volume of the rotating body of the area VPWV around $x$ axis, thereby increasing the thrust for shifting the pump impeller 22 to the left. The $y$ coordinate of the point V in FIG. 5 shows the radial distance of a plurality of balance holes 32 formed in the pump impeller 22. The $x$ coordinate of the point V shows the pressure at the point V. The thrust surface 36 of the bearing 35 is formed with a plurality of recesses $a\ d\ c\ b\ f\ e\ a$ shown shaded in FIGS. 3 and 4. The surface $a\ b\ c\ d$ of each recess is slightly inclined from the direction of rotation of the bearing as shown by an arrow. Thus, if the bearing 35 rotates in the viscous liquid with a slight gap $\delta$ from the stationary thrust collar 14 as shown in FIG. 2, the inclined surface of the bearing 35 is subjected to a force $F_q$ in the axial direction as shown in FIG. 4 in a sense such that the pump impeller 22 is caused to be displaced to the left.

As a result of the operation of the lubricating device according to the invention there occurs a new force $F_t = F_p + F_q$ which becomes balanced with $F_1 = F_m - F_s$ during the operation of the pump.

When the pump is being driven in a complete balanced state with a slight gap $\delta$ formed between two thrust surfaces as shown in FIG. 2, even if the bearing 35 is displaced to the left owing to certain reasons the gap $\delta$ does not become wider and the attractive force Fm does not vary except for any unexpected variation of the constant supply voltage. Therefore, when the gap $\delta$ becomes wider in spite of a substantially constant $F_1$, the resistance against the lubricating liquid flowing the passage is decreased and the rate of flow of the lubricating liquid velocity $v$ is increased, so that there occurs the pressure drop of the liquid due to the passage loss in the filter 53, the pipe 63, and the interior bore hole 20 of the stationary shaft 15. The pressure distribution is thus shown by a curve MVP′ in FIG. 5, thereby decreasing the original force of $F_p$ by the force proportional to the volume of the rotating body of the area VPP′V around the $x$ axis. If $\delta$ is increased, $F_q$ is decreased inversely proportional to the square of $\delta$, so that $F_t \ll F_1$ which permits the bearing to move to the right.

On the contrary, if the pump impeller 22 and hence the bearing 35 moves in excess to the right, $\delta$ becomes narrow irrespective an almost constant $F_1$ by which the rate of flow of the lubricating liquid velocity $v$ is decreased. The pressure distribution in the chamber B is thus changed into a curve MVP″ shown in FIG. 5. The original force $F_p$ is increased by the force proportional to the volume of the rotating body of the area VP″PV around the $x$ axis. From the above mentioned reason, $F_q$ is remarkably increased to make $F_t \gg F_1$. Thus, when more displacement is produced, a stronger restoring force is obtained with the result that the bearing 35 can be kept rotated with a proper slight gap $\delta$ and under a balanced thrust condition without any displacement.

Figure 6:
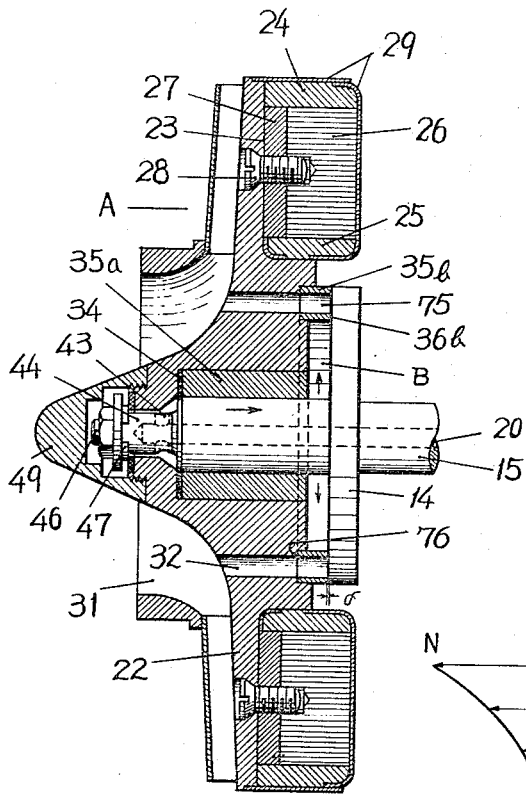
FIG. 6 is a longitudinal sectional view of a part of a pump provided with another embodiment of the present invention.

FIG. 6 shows another embodiment wherein the bearing of the pump impeller comprises a cylindrical radial bearing 35a and an annular rotating thrust bearing 35b.

Figure 7:
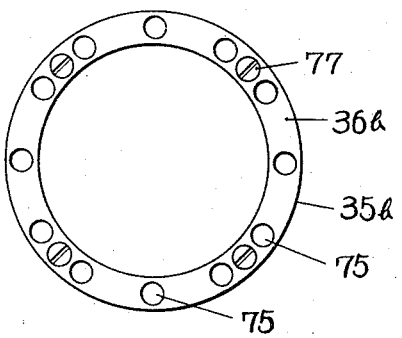
FIG. 7 is a front view of a radial thrust bearing of the device shown in FIG. 6.

In the center boss portion 33 of the pump impeller 22 is fitted under pressure a cylindrical radial bearing 35a which is mounted around the inside portion of the stationary shaft 15 to form a radial sliding member. The pump impeller 22 is provided at the inside surface of the center boss portion 33 with an annular recess 76 into which is fitted an annular rotating thrust bearing 35b. As shown in FIG. 7, the annular rotating thrust bearing 35b is formed with several apertures 75 coincident with several balance holes 32 in the pump impeller and secured to the annular recess 76 by means of several dish screws 77. The outer end surface of the annular rotating bearing 35b is brought into engagement with the thrust collar 14 of the stationary shaft 15 to form a thrust surface 36b therebetween.

During rotation of the pump impeller 22 in the liquid the high pressure liquid flows through the interior bore hole 20 and is forced from the hole 43 in jet form to lubricate the radial sliding portion formed between the inside portion of the stationary shaft 15 and the radial bearing 35a and then flows through a narrow gap formed between the thrust collar 14 and the thrust surface 36b, the apertures 75 in the rotating thrust bearing 35b and the balance holes 32 in the pump impeller 22 into the suction inlet 31 of the pump.

Figure 8:
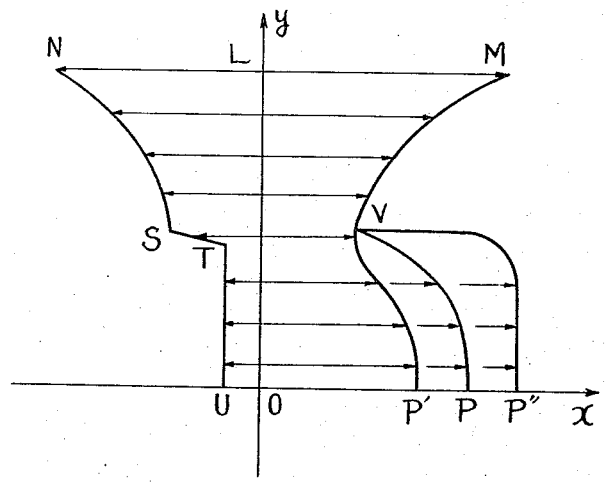
FIG. 8 is a graph illustrating the pressure distribution in the pump chambers shown in FIG. 6.

The pressure distribution in the left side chamber A and the right side chamber B shown in FIG. 6 at several points distant from the center line of the stationary shaft 15 in the radial direction thereof is similar to that shown in FIG. 5 as is shown in FIG. 8.

During the normal operation of the device shown in FIG. 6, it is possible to operate the pump with a slight gap $\delta$ formed between the thrust collar 14 and the rotating thrust bearing 35b and filled with a liquid film without a solid to solid direct contact having to be made between the two.

That is, during the normal operation the pressure distribution in the chamber B is shown by OLMVPO in FIG. 8. If the gap $\delta$ becomes narrower due to some cause the resistance against the flow of the lubricating liquid towards the balance holes 32 is rapidly increased to decrease the amount of flow of the lubricating liquid. Thus, the pressure distribution in the chamber B is changed into OLMVP″O to increase the pressure in the chamber B, with the result that the thrust is produced in such direction as to keep the value of $\delta$ in the normal value thereof. On the contrary, if the gap $\delta$ becomes wider due to some cause the resistance against the flow of the lubricating liquid towards the balance hole 32 is rapidly decreased to increase the amount of flow of the lubricating liquid. Thus, the pressure distribution in the chamber B is changed into OLMVP′O to decrease the pressure in the chamber B, with the result that the thrust is produced in such direction as to keep the value of $\delta$ in the normal value thereof.

The construction and function of the other parts of the device shown in FIG. 6 are the same as those of the device shown in FIG. 1. In the device shown in FIG. 6 the bearing is divided into the radial bearing 35a and the rotating thrust bearing 35b. As a result of this, the additional advantage is obtained that, if the outer diameter of the thrust collar 14 or of the rotating thrust bearing 35b is made larger, fluctuation during the operation can be reduced so as to increase the stabilizing effect.

According to the above mentioned principle, the invention ensures continuous lubrication with the aid of the liquid itself of the rotating surface formed between the stationary shaft and the bearing of the pump impeller and further provides the important advantage that the rotating surface formed between the stationary shaft and the bearing is not worn by adhesion, that the radial bearing can also be subjected to lubrication and the axial thrust is caused to be balanced by the medium of the liquid so that the power consumed at the bearing can considerably be reduced if compared with the radial bearing adapted to make a solid to solid direct contact, and that the continuous lubrication of the shaft renders it possible to prevent the temperature of the shaft from rising. The present invention also causes no attrition of the thrust surface so that the worst condition that the rotating speed of the pump impeller becomes so low as to make the operation of the pump impossible can be avoided, such worst condition resulting from attrition of the thrust surface which gives rise to the formation of a narrower air gap and hence to the occurrence of a solid to solid direct sliding contact between the partition wall plate and the rotor. Thus, the present invention provides a completely leakproof pump provided with an axial air gap type induction motor, which is efficient in operation and long in life.

Though the invention is described by means of two embodiments as shown in the drawings, yet various modifications can of course be made without departing from the scope of the claims.

What I claim is:

1. A device for lubricating a bearing and balancing axial thrust for use in a pump provided with an axial air gap type induction motor and an impeller, comprising a stationary shaft having therein a coaxial bore hole extending therethrough and constituting an axis of rotation for said impeller, a radial bearing rotatably mounted on said stationary shaft and secured to said impeller, a thrust bearing comprising a stationary part formed integral with said stationary shaft and a moving part formed radially spaced from said radial bearing, a low pressure chamber between said thrust bearing and said radial bearing, at least one balance hole in said amplifier placing said chamber in communication with an inlet of said pump, means for feeding a high pressure fluid as a lubricating liquid from an outlet of said pump sequentially through said bore hole of said stationary shaft, said radial bearing, said chamber, said thrust bearing, and said at least one balance hole to the inlet of said pump, and at least one hole formed in said moving part of said thrust bearing such that said last mentioned hole and said at least one balance hole cooperate to produce a force in the axial direction by the lubricating liquid.

2. A device for lubricating a bearing and balancing axial thrust for use in a pump provided with an axial air gap type induction motor and an impeller, comprising a stationary shaft having a coaxial bore hole therein extending therethrough and constituting an axis of rotation for said impeller, a radial bearing rotatably mounted on said stationary shaft and secured to said impeller, a thrust bearing comprising a stationary part formed integral with said stationary shaft and a moving part radially spaced from said radial bearing, a low pressure chamber formed between said radial bearing and said thrust bearing, at least one balance hole in said impeller placing said thrust bearing in communication with an inlet of said pump, means for feeding a high pressure fluid as a lubricating liquid from an outlet of said pump sequentially through said bore hole of said stationary shaft, said radial bearing, said chamber, said thrust bearing, and said balance holes to the inlet of said pump whilst simultaneously balancing axial thrust with the aid of said lubricating liquid.

References Cited
UNITED STATES PATENTS

| | | | |
|---|---|---|---|
| 2,586,617 | 2/1952 | Danly | 184—6 |
| 2,741,990 | 4/1956 | White | 103—87 |
| 2,921,533 | 1/1960 | Williams | 308—9 X |
| 2,953,416 | 9/1960 | Collins et al. | 308—168 X |

FOREIGN PATENTS

| | | |
|---|---|---|
| 536,016 | 1/1957 | Canada. |
| 1,361,763 | 4/1964 | France. |
| 1,152,344 | 9/1957 | France. |

LAVERNE D. GEIGER, *Primary Examiner.*

E. J. EARLS, *Assistant Examiner.*